United States Patent Office.

ALFRED LISTER, EDWIN LISTER, AND CHARLES J. EAMES, OF NEWARK, NEW JERSEY.

Letters Patent No. 109,638, dated November 29, 1870.

IMPROVEMENT IN DEODORIZING THE AIR AND GASES IN FAT-RENDERING, BONE-BOILING, &c.

The Schedule referred to in these Letters Patent and making part of the same.

*To all whom it may concern:*

Be it known that we, ALFRED LISTER, EDWIN LISTER, and CHARLES J. EAMES, of the city of Newark, county of Essex, in the State of New Jersey, have invented an Improvement in Disinfecting and Deodorizing the Gases produced by Fat-Renderers, Bone-Boilers, and others; and we do hereby declare that the following is a full and exact description thereof.

The object of our invention is to prevent the noxious gases arising from the tanks or kettles used in the rendering of fat or boiling of bones or other material from contaminating the atmosphere and producing unpleasant odors.

We have found that when these gases are distended by heat they will arise to a certain height, and when they become cool will gradually descend and disseminate themselves.

We find, by analysis, these gases are charged with carbonic acid, sulphureted hydrogen, and ammoniacal gases, holding in their combination other gases of a fetid odor.

From continued experiments we find it impossible to destroy or materially change the vapors or gases by heat in contact with fire, or by driving them into ordinary fire-flues. In such cases they become surcharged with other gases, also deleterious.

We have found, by bringing these gases in contact with water at a low temperature, they are readily absorbed, and effectually prevented from becoming disengaged.

Our invention consists in collecting the gases at the highest point of the building in which the operations of rendering and boiling are carried on, by means of ducts or leaders, and drawing them to a tower, constructed of wood or other material, of a size equal to the volume of gases to be condensed, by means of a tank or cistern placed on top of said tower, and being perforated with very fine holes at the bottom of said tank, cold water is allowed to descend, the action of which is to draw in the gases and mix them with the descending water.

In order that the now purified air may be liberated, we attach an exhaust or blower at the base of said tower, to draw off the accumulation of fresh cold air and discharge it into the building.

Our tower is constructed with a siphon-overflow at the bottom, always maintaining a depth of six inches of water, as a seal to prevent an escape of air, and also to hold the vacuum formed by the exhaust.

It is obvious that the holes or perforations in the bottom of tank placed on top of tower should be so small that said tank will always maintain from five to six inches depth of water in it.

As an example for all ordinary operations, we construct a tower of wood or other material, about thirty feet high and about four feet square, on top of which we place a tank lined with sheet-zinc or other material, and being perforated on the bottom with fine holes about one thirty-second of an inch in diameter, with an overflow attached; and about four feet below this tank we make openings to admit the end of the ducts, or leaders; and at about two feet from the bottom of said tower we connect, by means of a duct or leader, the exhaust or blower; and about two inches from the bottom of said tower we connect a pipe, by boring through the tower to the inside, and leading said pipe up on the outside to a height of about four or five inches, by this means form a trap for the water-overflow, and this always allows about six inches of water to remain in the bottom of said tower. This pipe or overflow is about four inches in diameter.

The lengths and size of the ducts or leaders are governed by size of space and volume of gases to be purified.

The operation of this apparatus is as follows:

The ducts or leaders, having a wide opening at their extreme ends, are carried to the highest point of a building on the inside, or where the heated and noxious gases have accumulated, are drawn in through said ducts to the tower by means of the falling water, and are immediately absorbed and condensed, and are then drawn out of the tower, by means of the exhaust, in a purified state, and are of such a low temperature that the surrounding heated gases readily ascend.

What we claim, and desire to secure by Letters Patent, is—

The apparatus and process above-described, method for disinfecting and deodorizing the gases produced by fat-rendering, bone-boiling, and by any other means, substantially as herein set forth.

ALFRED LISTER.
EDWIN LISTER.
CHARLES J. EAMES.

Witnesses:
J. WHITEHEAD,
SAM. A. WEAVER, Jr.